Jan. 12, 1971   P. E. DUNSTAN   3,553,884
TOY AERODYNAMIC WING
Filed July 31, 1968   2 Sheets-Sheet 1
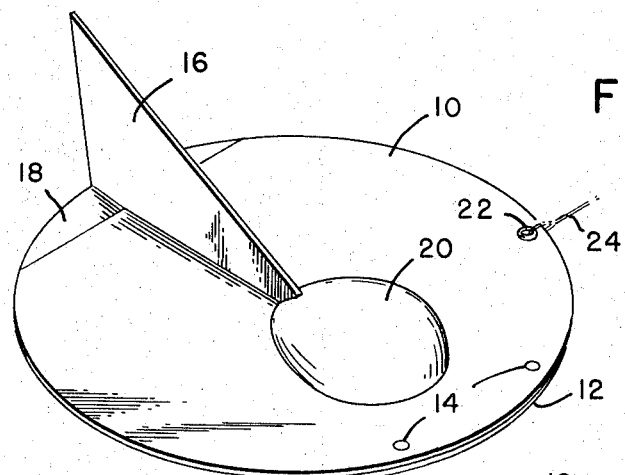
FIG—1
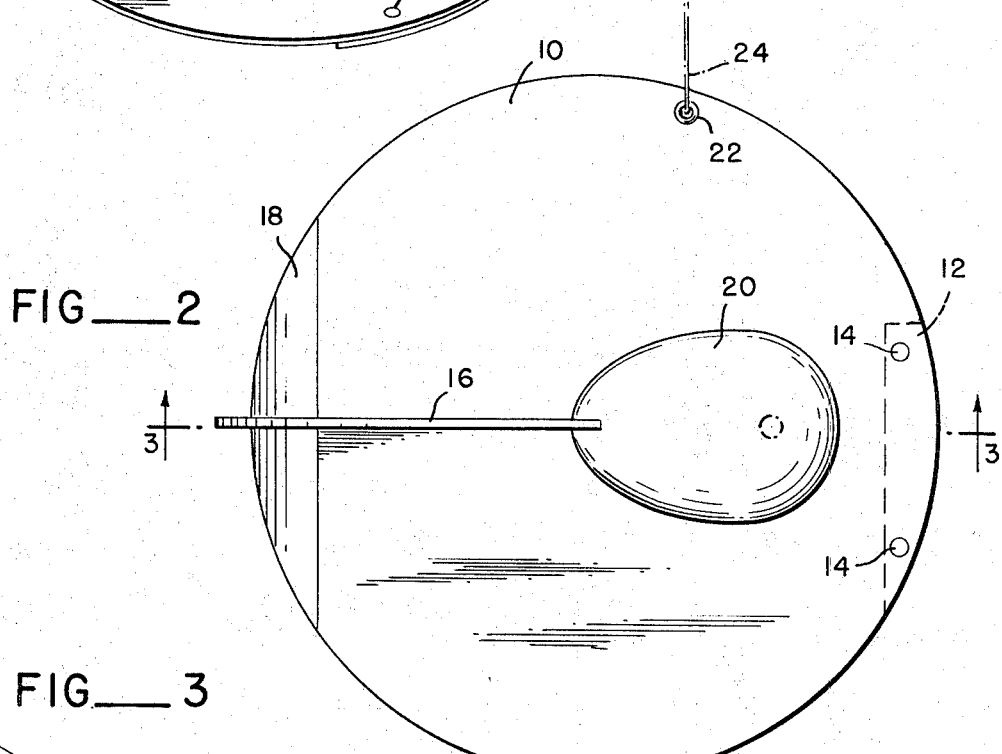
FIG—2
FIG—3
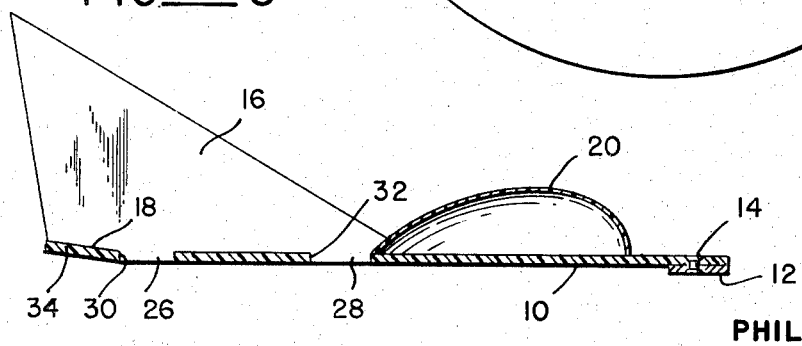
FIG—8
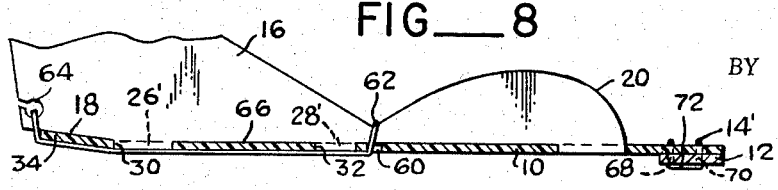
PHILLIP E. DUNSTAN
INVENTOR.
BY Seed, Berry & Dowrey
ATTORNEYS

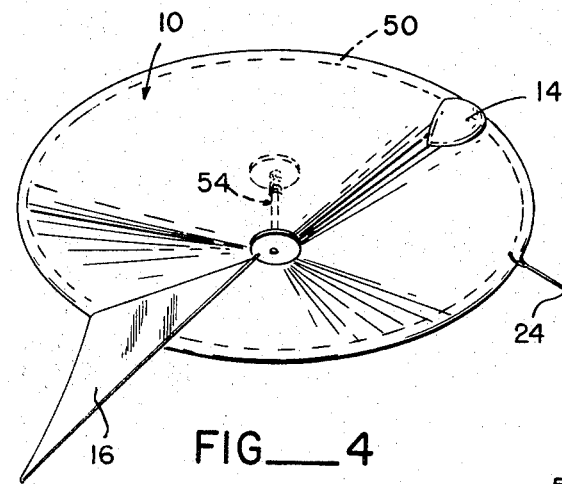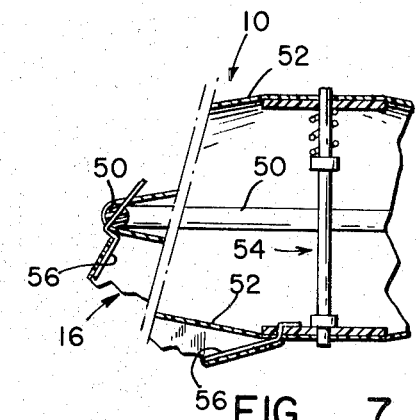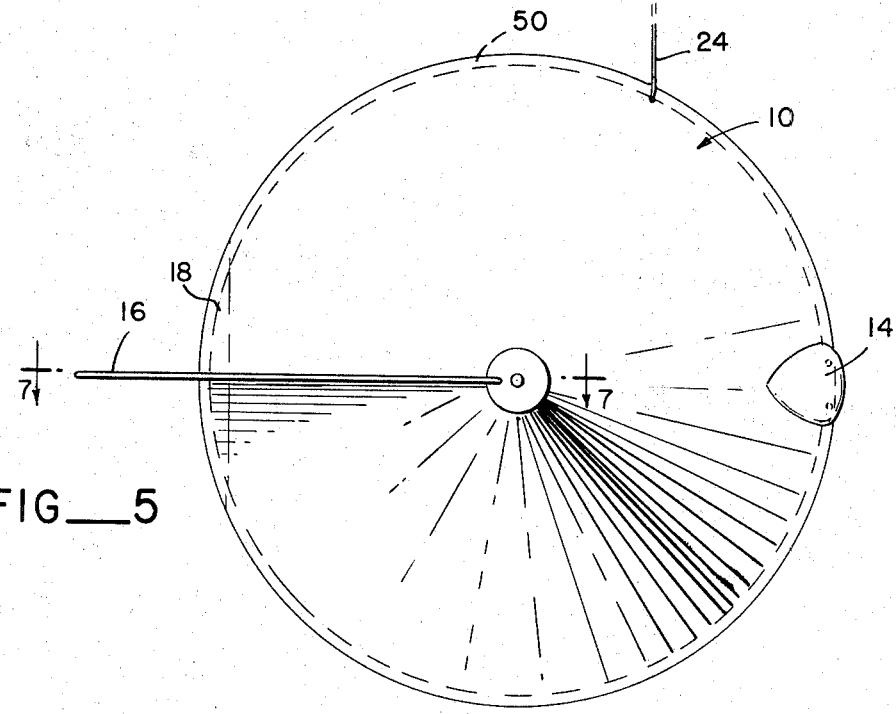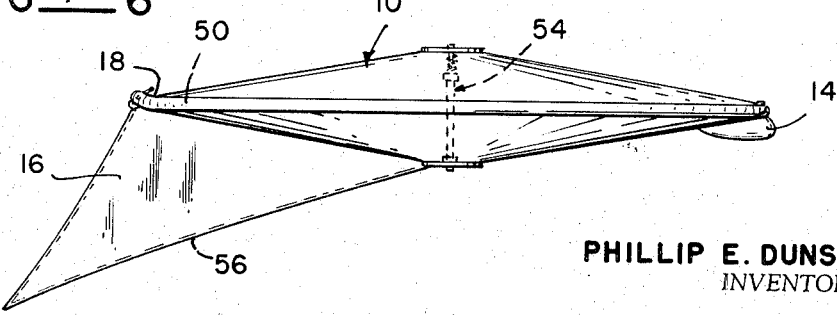

United States Patent Office 3,553,884
Patented Jan. 12, 1971

3,553,884
TOY AERODYNAMIC WING
Phillip E. Dunstan, 1022 S. 208th St.,
Seattle, Wash. 98148
Filed July 31, 1968, Ser. No. 749,066
Int. Cl. A63h 27/14
U.S. Cl. 46—81                                             3 Claims

ABSTRACT OF THE DISCLOSURE

A toy aircraft comprises an aerodynamic wing member with a weighted leading edge and an upturned trailing edge, a vertical stabilizer fin, and a launching cord attached to the wing for launching the aircraft by swinging the aircraft at the end of the launching cord and releasing the cord. The wing is preferably provided in the configuration of a circular disk.

---

In brief, the toy aircraft of this invention comprises an aerodynamic wind member, a weight mounted to the wing forwardly of the wind center of lift such that the aircraft center of gravity is located forwardly of the center of lift, and a rearwardly-extending vertical stabilizer fin mounted to the wing to maintain lift and pitch stabilizing forces of the aircraft in close alignment with the center of gravity during flight. The upper surface of the wing, along its tailing end, is upturned to provide a horizontal stabilizer. The fin may extend from either the upper or lower surface of the wing. An eyelet, or a like device, is provided in the outboard end of the wing generally opposite the center of gravity. A launching cord, or a like device, is attached to the eyelet such that the aircraft may be swung at the end of the cord. The stability characteristics of the aircraft may be enhanced by providing a dihedral lower wing surface. The wing lift surface is substantially completely unobstructed except for the weighted leading edge and the fin (if applied to the wing underside). The wing is not subdivided by a fuselage or any other aerodynamic member. Thus, the aircraft of this invention is a true flying wing.

The aircraft is launched by swinging the wing at the end of the cord in a circle until the desired air speed is attained and then releasing the cord. Upon departure from the launching circle, the aircraft does not rotate or spin, but rather departs generally tangentially to the launching circle and then dramatically begins its ascent to a rather substantial elevation dependent upon launch speed, aircraft weight and size. Thereafter the aircraft will gently glide down to earth.

The overall effect is one that would be imagined to be created by a miniature flying saucer. To enhance that effect, the wing member is preferably circular in plan view (i.e. a saucer-shaped disk). If the trailing edge of the fin is creased or otherwise hinged such that it may be cocked relative to the centerline of the aircraft, the aircraft will return to earth in a spiral flight path.

Referring to the FIGS. 1–3 embodiment, the toy aircraft depicted comprises a circular disk wing member 10, a thin section-shaped weight member 12 mounted under the leading edge of the wing by rivets or other suitable fasteners 14, and having an arcuate edge curvature matching the wing leading edge curvature, and a vertical stabilizer fin 16. The trailing edge 18 of the wing is upturned to provide a horizontal stabilizer along the upper trailing surface of the wing. For decorative purposes, a canopy 20 may be mounted forwardly of the fin. An eyelet 22 is provided in the outboard edge of the wing for attachment of a launching cord 24. The fin is provided with two depending tabs 26 and 28 for insertion into corresponding slots 30 and 32 provided through the wing.

The rearward base section 34 of the fin is inclined rearwardly upward at the acute angle required for the wing horizontal stabilizer section 18. The fin and canopy are bonded to the wing by suitable means such as gluing. The wing and fin components of the FIGS. 1–3 embodiment may be fabricated from a thin sheet of foamed plastic material such as styrofoam, and the counterbalance weight may be fabricated from a thin plate of lead or other dense metal. Positioning the weight on the underside of the wing leading edge will serve to protect the wing during landing, in addition to providing a counter-balance effect.

The launch cord eyelet 22 is positioned on a line of intersection which is normal to the longitudinal line-of-flight axis of the aircraft and generally intersecting with the aircraft center of gravity. Any substantial variation of the eyelet position from that preferred would have a detrimental effect on the aircraft's performance inasmuch as the aircraft would be unstable when swung at the end of the chord and would not achieve proper launch speed or attitude.

In the FIGS. 4–7 embodiment, a circumferential compression hoop 50 defines the periphery of the wing 10. The top and bottom surfaces of the wing are provided by a thin skin 52 fabricated from a material such as plastic sheeting. A spring-loaded spreader assembly 54 is provided at the axis of the hoop to separate the skins and maintain their tautness. The fin 16 of this embodiment depends from the underside and is provided with a peripheral edge rib 56 of triangular shape that is secured at its forward and aft ends to the spreader assembly and the hoop, respectively, and covered with a skin fabricated from a material such as plastic sheeting. The weight 14 of this embodiment is a snub-nosed element that is mounted to the underside of the hoop and protrudes beyond the underside of the wing. The horizontal elevator section 18 of the wing is provided by bending the trailing arcuate section of the hoop upward. The launching cord 24 is secured to the hoop rim in any suitable manner.

The FIG. 8 embodiment is adapted to be assembled and held together by elastic bands, and therefore is suitable for shipment in a knock-down condition in a flat package. The decorative canopy is fabricated as a portion of the flat fin 16 and is therefore simply a silouette. As in the FIG. 1 embodiment, two tabs 26' and 28' are provided in the bottom edge of the fin for insertion through appropriately-located slots 30' and 32' in the wing. In addition, a slot 60 is provided through the wing below the transition point 62 between the canopy and the vertical stabilizer portion of the fin. Also the trailing edge of the fin is provided with a notch 64. An elastic band 66 is fitted over the fin at point 62, inserted through the slot 60, extended rearwardly along the underside of the wing, and inserted into notch 64 to secure the fin to the wing. The weight 14' is provided with sets of notches 68 at the edges of its forward and aft sides overlaying slots 70 provided through the wing. An elastic band 72 is fitted into the notches 68 at one end of the weight, extended through the overlaying slot 70 and transversely across the wing, and extended down through the other slot 70 and fitted into the notches 68 at the other end of the weight to secure the weight to the wing. The rearward base section 34' of the fin is inclined rearwardly upward and the trailing end of the wing is scored or other wise suitably formed such that the elastic band will cause the trailing edge of the wing to bend upward into contact with the fin to provide the required horizontal stabilizer.

In the three embodiments depicted, the launching cord 24 will travel with with the aircraft after launching. In these embodiments, it is preferred that the weight center be shifted to account for the weight of the launching cord and eyelet and counteract for the drag of the trailing cord when the weight is fairly light as could be the case when the aircraft has a small diameter wing fabricated from Styrofoam plastic.

Alternatively to the use of a launching cord, a hand held and operated launching device may be employed when the wing is provided with a clasp engagable by the device. By actuating the trigger of the launching device as the aircraft is swung at the end thereof, the device will release the wing clasp and the aircraft will begin its flight.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A toy aerodynamic wing comprising,
    a generally circular, lightweight, relatively thin disc wing member having an upturned trailing end surface,
    a leading edge weight member mounted to the leading edge of the wing member,
    a vertical stabilizer fin mounted on said wing member to maintain lift and pitch stabilizing forces, the fin mounted in close alignment with the aircraft center of gravity during flight, and
    a launching cord attached to an edge wing member at a point normal to the longitudinal line of flight axis of the aerodynamic wing member and generally intersecting the center of gravity thereof, the launching cord adapted to remain with the wing member during flight,
    the leading edge weight member offset in a direction opposite the point of attachment of the launching cord to the wing member to counteract the weight and drag of the trailing launch cord.

2. The toy of claim 1 wherein said fin is provided with tab extending outward from its base edge, and wherein said wing member is provided with slots adapted to receive said tabs, and wherein the rearward base section of said fin is inclined rearwardly upward to accommodate the upturned trailing edge of said wing member.

3. The toy of claim 1 including an elastic band, and wherein said fin is detachably mounted to said wing member by said elastic band.

References Cited

UNITED STATES PATENTS

| | | | |
|---|---|---|---|
| 2,932,124 | 4/1960 | Robinette | 46—79 |
| 3,246,425 | 4/1966 | Miller | 46—79 |

FOREIGN PATENTS

| | | | |
|---|---|---|---|
| 707,259 | 1931 | France | 46—79 |
| 467,331 | 1951 | Italy | 46—74 |

LOUIS G. MANCENE, Primary Examiner
A. J. HEINZ, Assistant Examiner

U.S. Cl. X.R.

124—5